United States Patent
Kawaguchi et al.

(10) Patent No.: US 8,330,113 B2
(45) Date of Patent: Dec. 11, 2012

(54) COLLIMATOR, RADIOLOGICAL IMAGING APPARATUS AND NUCLEAR MEDICINE DIAGNOSIS APPARATUS

(75) Inventors: Tsuneaki Kawaguchi, Kashiwa (JP);
Masatoshi Tanaka, Kashiwa (JP);
Shigeru Kimura, Hitachi (JP);
Katsutoshi Tsuchiya, Hitachi (JP);
Masami Murayama, Hitachi (JP);
Junichi Katogi, Higashiibaraki (JP)

(73) Assignees: Hitachi, Ltd., Tokyo (JP); Hitachi Cable Mec-Tech, Ltd., Ibaraki (JP)

( * ) Notice: Subject to any disclaimer, the term of this patent is extended or adjusted under 35 U.S.C. 154(b) by 1315 days.

(21) Appl. No.: 12/019,269

(22) Filed: Jan. 24, 2008

(65) Prior Publication Data

US 2011/0233412 A1    Sep. 29, 2011

(30) Foreign Application Priority Data

Apr. 26, 2007 (JP) ................. 2007-116665

(51) Int. Cl.
*G01T 1/00* (2006.01)
(52) U.S. Cl. .................................. 250/363.1
(58) Field of Classification Search ............ 250/363.1
See application file for complete search history.

(56) References Cited

U.S. PATENT DOCUMENTS

| | | | | |
|---|---|---|---|---|
| 3,543,384 A | * | 12/1970 | Hansen | 82/47 |
| 4,127,398 A | * | 11/1978 | Singer, Jr. | 65/393 |
| 5,099,134 A | * | 3/1992 | Hase et al. | 250/505.1 |
| 5,263,075 A | * | 11/1993 | McGann et al. | 378/147 |
| 5,323,006 A | * | 6/1994 | Thompson et al. | 250/363.02 |
| 5,451,789 A | * | 9/1995 | Wong et al. | 250/363.03 |
| 5,949,850 A | * | 9/1999 | Tang | 378/154 |
| 6,252,938 B1 | * | 6/2001 | Tang | 378/154 |
| 6,734,430 B2 | * | 5/2004 | Soluri et al. | 250/363.1 |
| 6,993,110 B2 | * | 1/2006 | Hoffman | 378/19 |
| 7,221,737 B2 | * | 5/2007 | Hoheisel et al. | 378/154 |
| 7,274,022 B2 | * | 9/2007 | Soluri et al. | 250/363.1 |
| 7,707,854 B2 | * | 5/2010 | D'Urso | 65/393 |
| 2002/0175289 A1 | * | 11/2002 | Soluri et al. | 250/363.1 |
| 2005/0263717 A1 | * | 12/2005 | Soluri et al. | 250/474.1 |
| 2006/0065836 A1 | * | 3/2006 | Tsuchiya et al. | 250/363.1 |

(Continued)

FOREIGN PATENT DOCUMENTS

JP    A-07-301695    11/1995
(Continued)

OTHER PUBLICATIONS

Japanese Office Action in Japanese Patent Application No. 2007-116665 mailed May 31, 2011 (with English translation).

(Continued)

*Primary Examiner* — David Porta
*Assistant Examiner* — Djura Malevic
(74) *Attorney, Agent, or Firm* — Brundidge & Stanger, P.C.

(57) ABSTRACT

A collimator, a radiological imaging apparatus and a nuclear medicine diagnosis apparatus which are able to improve the sensitivity are provided. The radiological imaging apparatus has a collimator 11 disposed to oppose a radiological detection device 12 and having through-holes 11a for passing to the radiological detection device 12 gamma rays in a specified direction out of those radiated from an object to be examined. The collimator 11 is produced by mutually coupling a plurality of metal tubular members 11A each having the through-hole 11a with the help of a bonding agent S in alignment with a plurality of detectors 12a constituting the radiological detection device 12.

5 Claims, 11 Drawing Sheets

U.S. PATENT DOCUMENTS

| | | | |
|---|---|---|---|
| 2006/0108533 A1* | 5/2006 | McEvoy et al. | 250/367 |
| 2006/0202125 A1* | 9/2006 | Suhami | 250/368 |
| 2008/0073600 A1* | 3/2008 | Appleby et al. | 250/505.1 |
| 2008/0078937 A1* | 4/2008 | Tsuchiya et al. | 250/366 |
| 2008/0242980 A1* | 10/2008 | Lees et al. | 600/436 |

FOREIGN PATENT DOCUMENTS

| | | |
|---|---|---|
| JP | 11-030670 | 2/1999 |
| JP | A-2003-038482 | 2/2003 |
| JP | 2006119113 A | 5/2006 |
| JP | 2006-526761 | 11/2006 |
| JP | A-2007-504473 | 3/2007 |
| WO | 2004/107355 A1 | 12/2004 |

OTHER PUBLICATIONS

Japanese Office Action dated Nov. 7, 2011, issued in corresponding Japanese Patent Application No. 2007-116665.

* cited by examiner

Prior Art

COLLIMATOR, RADIOLOGICAL IMAGING APPARATUS AND NUCLEAR MEDICINE DIAGNOSIS APPARATUS

BACKGROUND OF THE INVENTION

The present invention relates to a collimator, a radiological imaging apparatus and a nuclear medicine diagnosis apparatus.

A radiological imaging apparatus has been known in which medicines given a token for discrimination by a radioisotope (hereinafter referred to as RI) are dosed to the intra-body of an object to be examined, gamma rays radiated from the RI are measured and the distribution of the medicines in the examining object body is imaged.

A known radiological imaging apparatus has single crystals of sodium iodide (hereinafter abbreviated as NaI) for converting gamma rays to optical rays and a photomultiplier tube for converting the optical rays the NaI emits to an electric signal, additionally having a succeeding stage of an electric circuit by which the position of an incident gamma ray is determined.

The RI dosed to the intra-body of examining object radiates gamma rays in all-around directions and therefore, for the sake of imaging, a collimator for permitting only gamma rays in a specified direction to be transmitted is used (see JP-A-11-30670, for example).

Figure 8A:
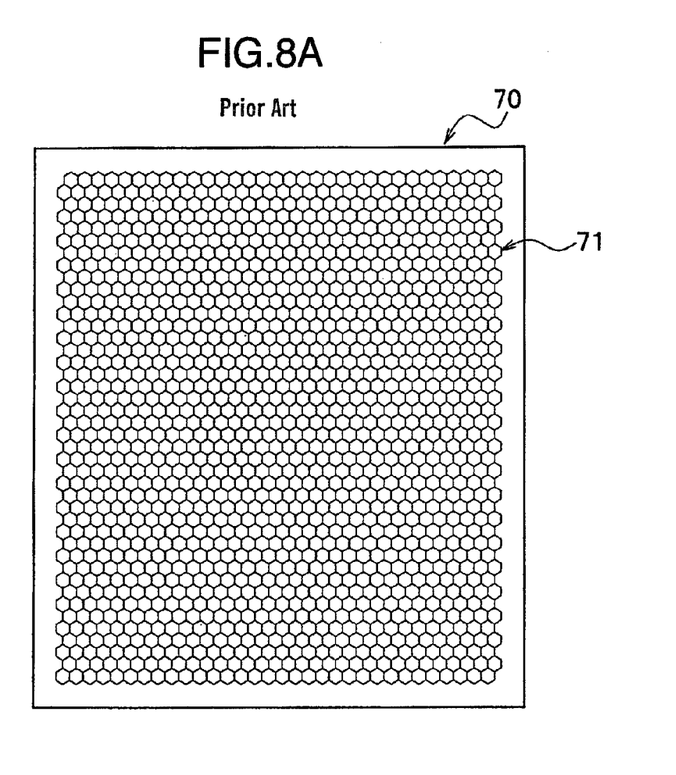
FIGS. 8A and 8B are diagrams useful to explain a collimator according to the prior art.
Figure 8B:
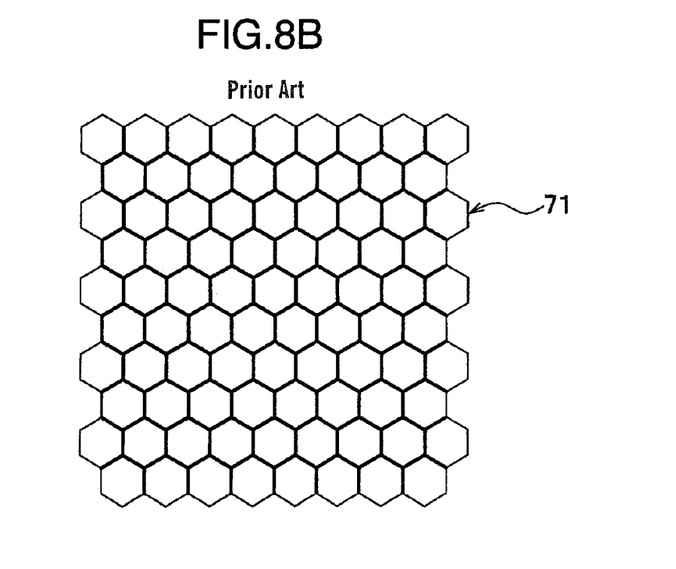

A general collimator as viewed from an examining object is schematically illustrated in FIG. 8A, the collimator designated by reference numeral 70 being depicted as having a honeycomb structure of a thin lead plate forming many hexagonal holes 71 (see FIG. 8B). The performance of this type of collimator 70 can be evaluated by its sensitivity indicative of the ability to transmit how many of gamma rays radiated from the examining object not shown and its resolution indicative of the ability to obtain images which are determined as to how far they are detailed. The sensitivity referred to herein can be increased by, for example, decreasing the thickness of the lead plate of honeycomb structure (hereinafter referred to as a partition wall thickness), by forming the hole 71 largely and by decreasing the thickness of the whole honeycomb structure (hereinafter referred to as collimator thickness). On the other hand, the resolution can be increased by making the hole 71 small or by increasing the collimator thickness.

Typically, the collimator 70 can be produced through various methods as described below.

Figure 9:
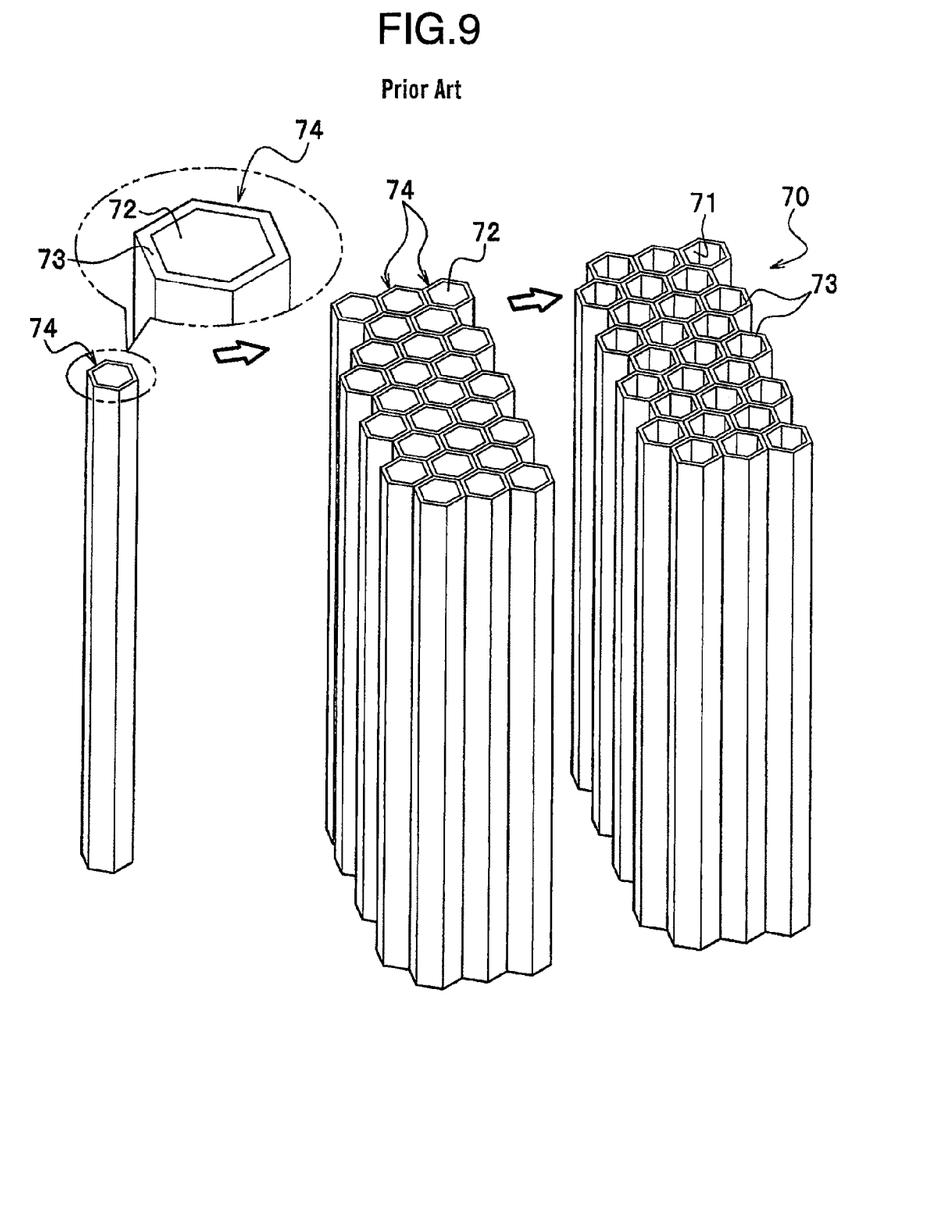
FIG. 9 is a diagram useful to explain an example of producing the prior art collimator shown in FIGS. 8A and 8B.

In a method shown in FIG. 9, a lead plate 73 is wound around a base member 72 of aluminum, for example, and the lead plate 73 integral with the base member 72 is rolled in a hexagonal form, thus forming a thin or minute strand 74. Then, a plurality of strands 74 are put and bonded together and thereafter respective base members 72 are resolved in an alkaline solution, for example, so as to be removed, so that the collimator 70 of honeycomb structure having many hexagonal holes 71 can eventually be produced.

In another method shown in FIG. 10, molds for forming hexagonal holes (hereinafter referred to as pins 76) are used, the pins 76 being formed by the same number as that of holes the collimator has. Opposite ends of a plurality of pins 76 arranged at predetermined intervals are held in position by means of meshed plates not shown, leaving behind gaps into which molten lead is poured and after the poured lead is cooled, the plurality of pins 76 are drawn out to thereby produce a collimator of honeycomb structure.

Incidentally, as a substitution for the NaI, a semiconductor material having high energy resolution has recently been available and a radiological detection device using a plurality of detectors each made of the semiconductor material has been put into practice.

Being different from the NaI, the radiological detection device has the function to directly convert incident gamma rays to electric signals. Therefore, the radiological detection device has an advantage that the number of conversion operations can be reduced as compared to the NaI combined with the photomultiplier tube for conversion to optical light which in turn is converted to an electric signal as described previously and so the energy utilization efficiency can be improved and noise can be reduced to enable the high energy resolution to be obtained.

Typically, this type of radiological detection device is so structured that detectors are arranged at the same pitch as the size of a matrix to be detected, with each detector having an easy-to-produce rectangular parallelepiped form and being arranged while having a square surface opposing the examining object and having its longitudinal direction aligned to the direction in which gamma rays are detected.

SUMMARY OF THE INVENTION

Figure 11A:
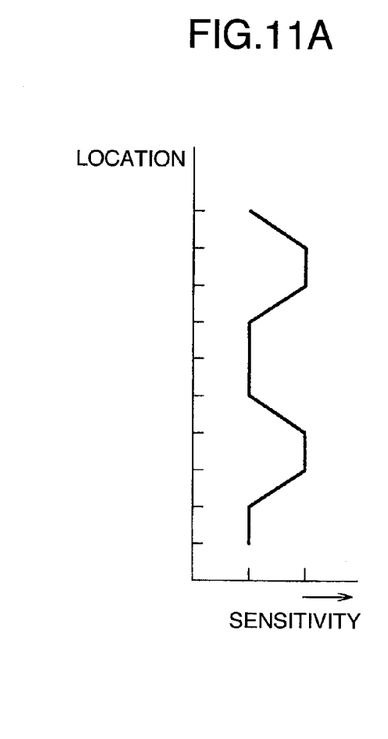
FIGS. 11A to 11C are diagrams useful to explain problems encountered in the prior art.
Figures 11B, 11C:
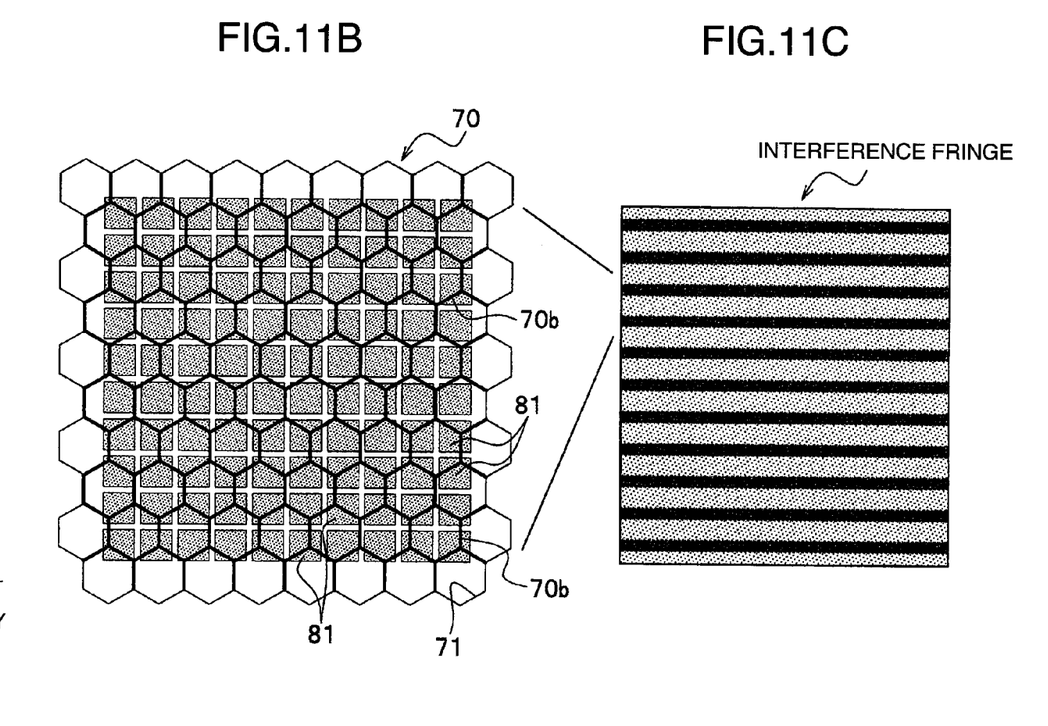

But when the detection device made of the semiconductor material is combined with the collimator produced through the aforementioned method to build a radiological imaging apparatus, the shape (square) of a detector 81 differs from the shape (hexagon) of hole 71 of the collimator 70 as shown in FIG. 11B and hence a shade made by a partition wall 70b of collimator 70 differs depending on locations, with the result that a large difference in sensitivity (see FIG. 11A) is caused and an interference fringe will sometimes be generated as shown in FIG. 11C. For the reasons as above, in the radiological imaging apparatus using detectors each having a square surface opposing the examining object, a collimator is needed in which squarely shaped holes respectively coincident with the detectors are arranged at the same arrangement pitch as the detectors with a view to preventing the generation of interference fringe.

In forming the collimator by using the aforementioned methods, however, there arise problems as will be described below. More particularly, in the method shown in FIG. 9, strands 74 can be arranged at the same arrangement pitch as that of detectors but bending or twisting is liable to occur during rolling of the strand 74 and uniformity cannot be maintained among the strands 74, giving rise to such inconvenience of formation of gaps. With the strand 74 bent or twisted and besides with non-uniformities in thickness dimension of the individual strands 74 are accumulated, a difference takes place between the position of the detector and that of the square hole of collimator 70, resulting in a difference in sensitivity (unevenness).

Figure 10:
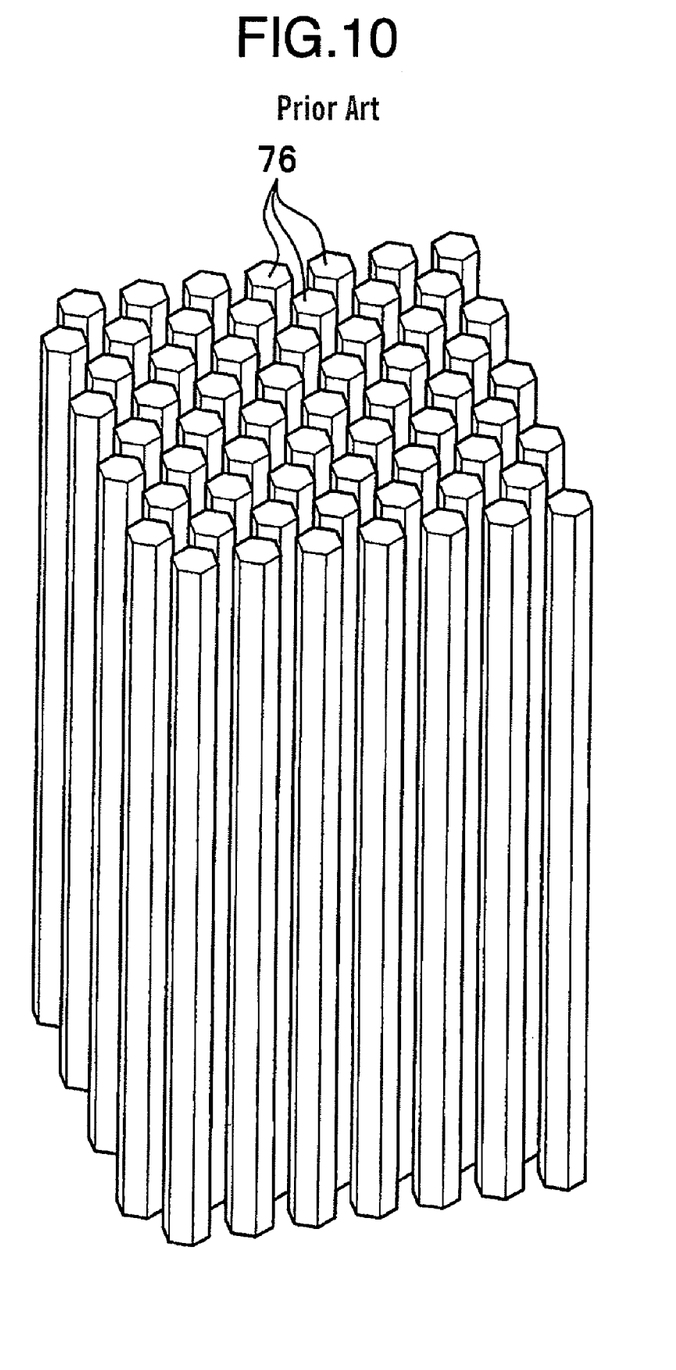
FIG. 10 is a diagram useful to explain another example of a method of producing the prior art collimator.

Further, in the method shown in FIG. 10, the arrangement pitch of the holes of collimator is prescribed by the lower and upper meshed plates (not shown) and hence the shifting hardly occurs. But since the partition wall thickness is thinner than the collimator thickness, flowing of lead into gaps is difficult to achieve. Further, in the course of drawing out the square pin, the lead wall will peel off and the partition wall will be broken.

The present invention intends to solve the above problems and its object is to provide a collimator, a radiological imaging apparatus and a nuclear medicine diagnosis apparatus which are able to improve the sensitivity.

To accomplish the above object, according to the present invention, a plurality of tubular members each having a through-hole for passage of gamma rays to a radiological detection device are mutually coupled with the help of a boding agent to form a collimator, so that the individual tubular members can be put together or assembled and coupled mutually while easily matching the arrangement pitch of radiological detectors with that of the through-holes to provide the collimator and the radiological imaging apparatus which are able to improve the sensitivity.

In a nuclear medicine diagnosis apparatus provided with the radiological imaging apparatus, by virtue of the improved sensitivity of the radiological imaging apparatus, the dosage of radioactive medicines can be reduced and the measuring time can be shortened.

According to the present invention, the collimator, radiological imaging apparatus and the nuclear medicine diagnosis apparatus which are able to improve the sensitivity can be provided.

Other objects, features and advantages of the invention will become apparent from the following description of the embodiments of the invention taken in conjunction with the accompanying drawings.

DETAILED DESCRIPTION OF THE EMBODIMENTS

A radiological imaging apparatus provided with a collimator of the present invention will now be described in greater detail by way of an example applied to an SPECT preferably embodying a nuclear medicine diagnosis apparatus by making reference to the accompanying drawings as necessary.

Figure 1:
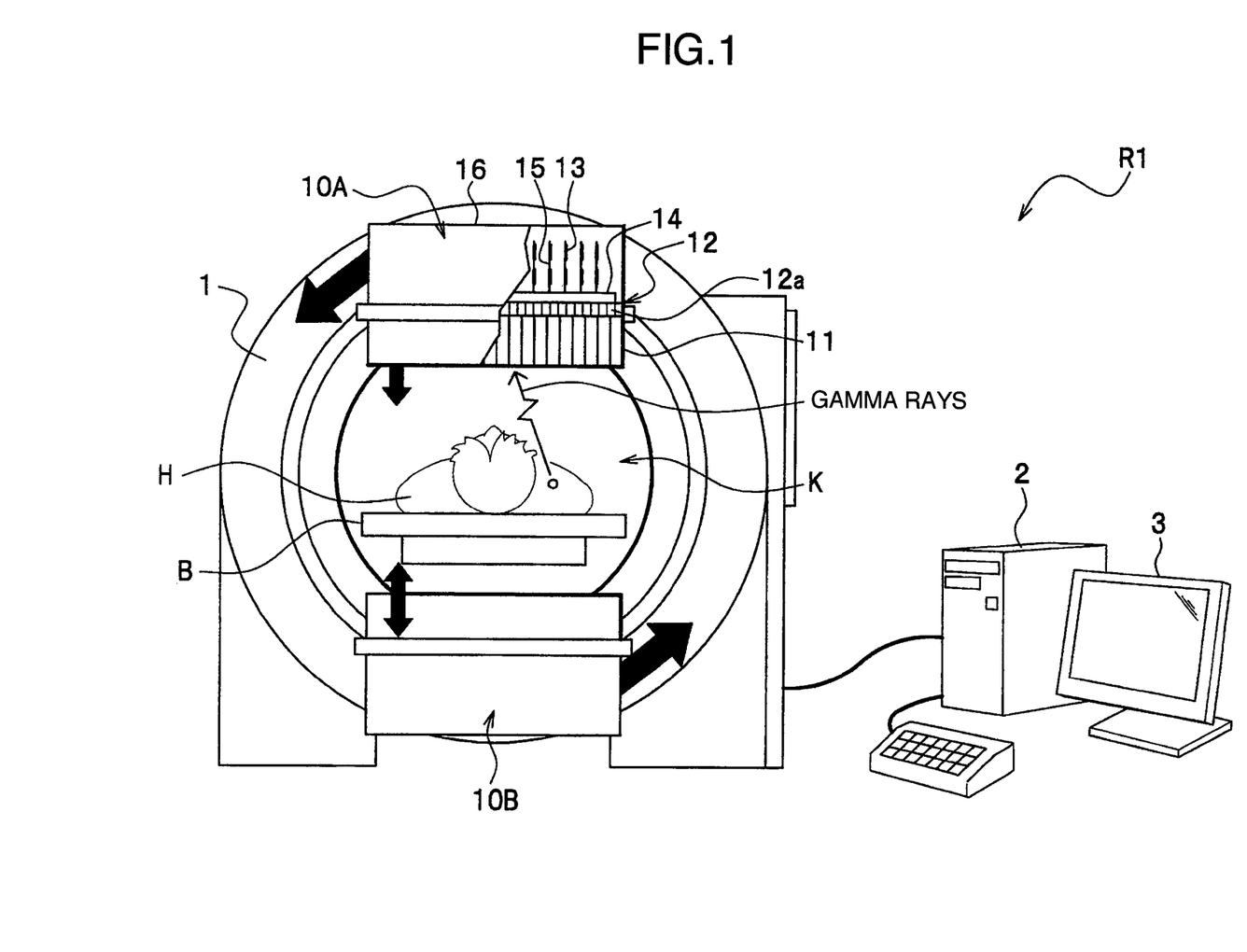
FIG. 1 is a schematic diagram illustrating the construction of an SPECT apparatus according to an embodiment of the present invention.

The SPECT apparatus typified by the present embodiment is installed in an examination room R1 inside a building as shown in FIG. 1, including a gantry 1, cameras 10A and 10B representing the radiological imaging apparatus, a bed B for supporting an object to be examined H, a data processor (such as a computer) 2 and a display unit 3.

In the SPECT apparatus as above, the examining object H is carried on the bed B movable in its longitudinal direction, inserted in a cavity K formed in the center of the SPECT imaging apparatus and imaged in a predetermined measurement mode set in advance. A radioactive medicine, for example, a medicine containing $^{99m}TC$ having a half-life of 6 hours has previously been dosed to the examining object H and gamma rays radiated from the $^{99m}TC$ in the intra-body of examining object H are detected by means of the cameras 10A and 10B to pick up a tomographic image.

The cameras 10A and 10B are constructed similarly to each other and the construction will be described by way of the camera 10A. The camera 10A includes a collimator 11 and a radiological detection device 12. The collimator 11 is arranged to oppose the radiological detection device 12 to select gamma rays emitted from the intra-body of examining object H and is formed with through-holes 11a (see FIG. 2) which function as radiological channels each permitting only gamma rays in a constant direction to pass therethrough, the through-holes being defined by a plurality of tubular metal members 11A (see FIG. 2), respectively, which are coupled to one another.

The radiological detection device 12 includes a plurality of detectors 12a each made of a semiconductor material and the detector 12a detects gamma rays having passed through the collimator 11. The camera 10A includes application specific integrated circuits (ASIC's) 13 for measuring gamma ray detection signals. A gamma ray detection signal detected by the detector 12a is inputted to the ASIC 13 via a detector substrate 14 and an ASIC substrate 15. In this phase, an ID of the detector 12a having detected gamma rays, a peak value of the detected gamma rays and a detection time are inputted to the ASIC 13. These components are surrounded by a light-shield/gamma ray and electromagnetic shield 16 made of iron, lead or the like constituting the camera 10A to interrupt light ray, gamma ray and electromagnetic wave.

The detector 12a has a laminar structure in which a plurality of semiconductor detection elements and electrically conductive members, which are not shown, are stacked alternately, forming multiple layers arranged within a partitioned area in the collimator 11 (an area defined by the through-hole 11a), though not shown. Used for the semiconductor detection element is a single crystal such as CdTe, CdZnTe or GaAs. The detector 12a is in no way limited to the laminate structure but it may be of a single layer or of a suitable laminar structure.

Each of the cameras 10A and 10B constructed as above is so arranged as to be movable in the radial and peripheral directions of the gantry 1 and during imaging, they take pictures while moving and tracing a nearby orbit around the examining object H carried on the bed B. Also, the camera 10A is rotatably mounted on an axis representing its fixture (not shown) to the gantry 1 and the two cameras 10A and 10B are juxtaposed to make it possible to pick up STATIC images. By detecting gamma rays radiated from the intra-body of the examining object H in this manner, the position of radioactive medicines accumulated on, for example, an ulcer inside the body of examining object H can be specified and the position of the ulcer can be settled.

The data processor 2 has a storage unit and a tomographic image information preparation unit which are not shown. The data processor 2 fetches a data packet including peak values of gamma rays measured by the cameras 10A and 10B, data of a detection time and an ID of the detector (channel) and creates a two-dimensional image or tomographic image information obtained by converting the two-dimensional data to sinogram data. The thus created tomographic image information is outputted to the display unit 3 and displayed thereon.

The collimator 11 featuring the present embodiment will now be detailed.

Figure 2:
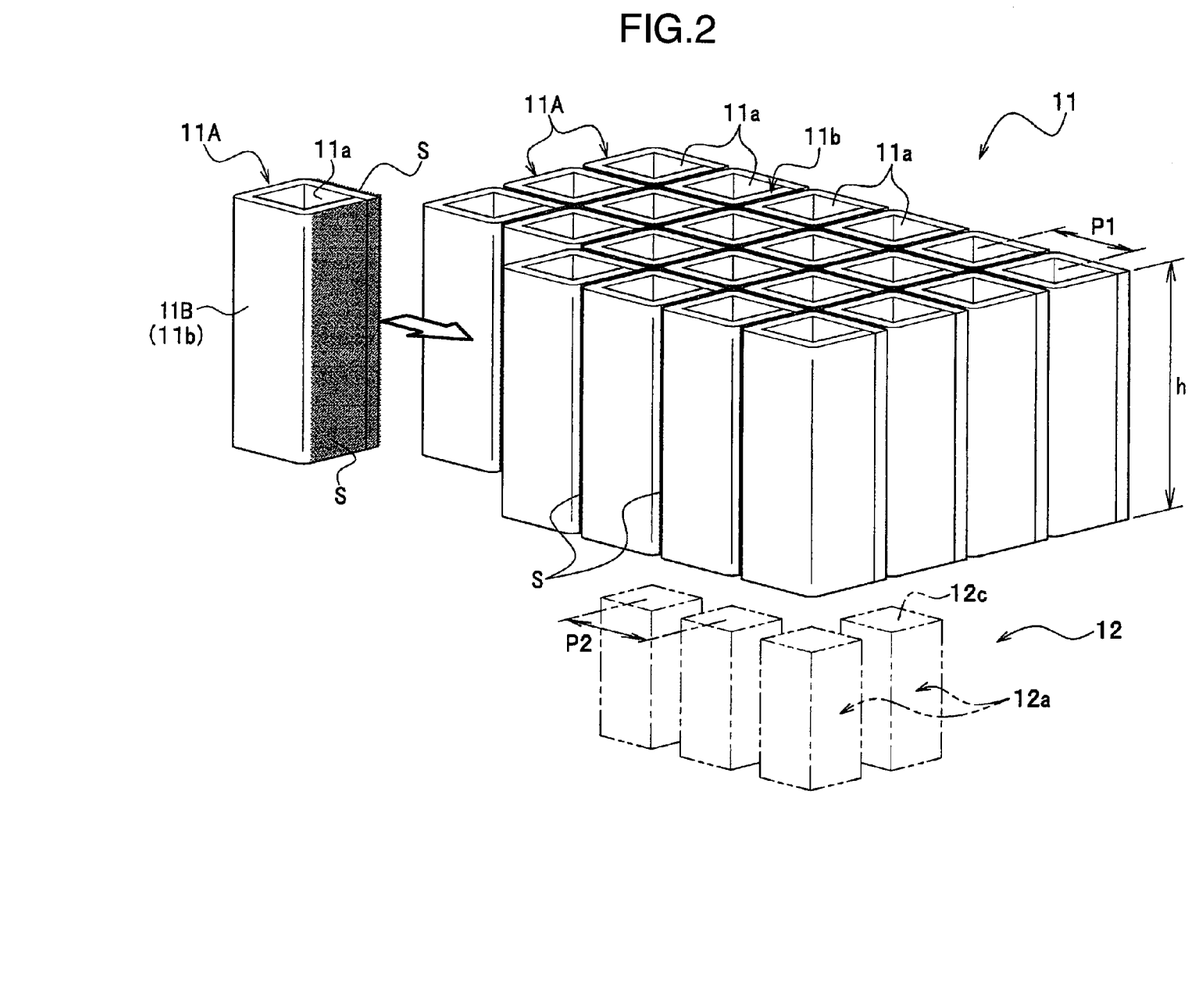
FIG. 2 is a diagrammatic perspective view showing a collimator in a midway stage of its production.

The collimator 11 is made of lead and has through-holes 11a forming squares of checkerboard which are partitioned by partition walls 11b as shown in FIG. 2. Each through-hole 11a has its opening of a quadrangular shape (square) corresponding to the shape (square) of an end surface 12c of the detector 12a (illustrated by chained and dotted line in FIG. 2 as holding true hereinafter) and the opening is sized substantially equally to that of the end surface 12c of detector 12a. An arrangement pitch P1 of the through-holes 11a coincides with an arrangement pitch P2 of detectors 12a. Namely, P1=P2 stands, ensuring that a difference in sensitivity can hardly occur among the individual detectors 12a and the occurrence of an interference fringe as in the prior art (see FIG. 11C) can be avoided.

The collimator 11 can be produced through a process as described below.

Figure 3A:
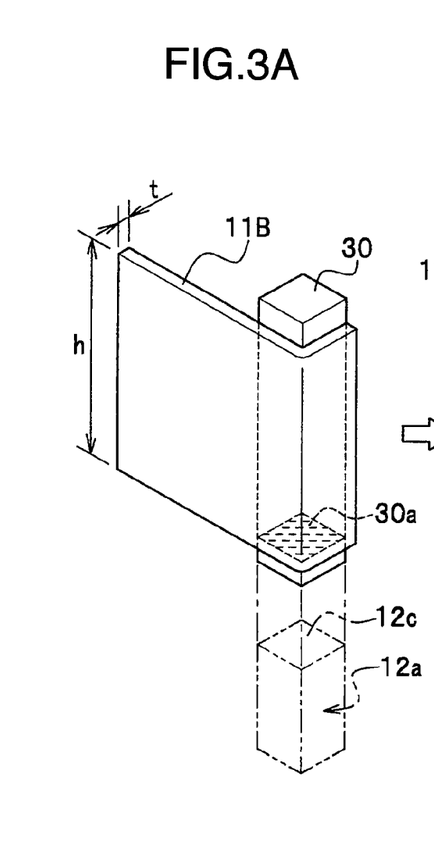
FIGS. 3A to 3C are diagrams showing an example of a process for producing the collimator.

Firstly, as shown in FIG. 3A, a quadrangular prism spool jig 30 is used and a lead sheet 11B is wound about the spool prism jig 30 to form a quadrangular tubular member 11A. Here, the spool jig 30 has a constant cross-sectional area 30a which is sized to be substantially coincident with the end surface 12c of detector 12a (illustrated by chained and dotted line). Accordingly, the through-hole 11a formed by the inner peripheral surface of tubular member 11A has its opening sized to be substantially coincident with the end surface 12c of detector 12a.

The lead sheet 11B has the same height dimension h as that h of the collimator 11 and a thickness t is substantially half a wall thickness T (see FIG. 3C) of a partition wall 11b of collimator 11. Then, when adjacent tubular members 11A are bonded together to be coupled to each other as will be described later, the partition wall 11b of the predetermined wall thickness T can be formed between the adjoining through-holes 11a.

Figure 3B:
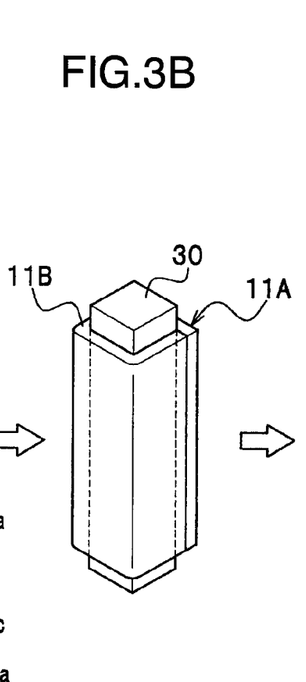
Figure 3C:
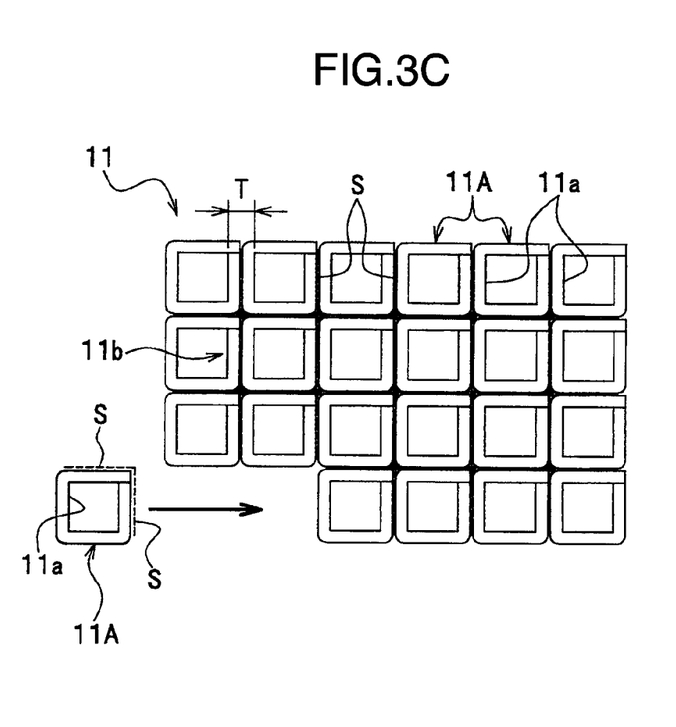

After the tubular member 11A has been formed from the lead sheet 11B as shown in FIG. 3B, the spool jig 30 is drawn out of the tubular member 11A. A plurality of tubular members 11A as above are produced by the number same as the number of holes necessary for collimator 11 (the number corresponding to the detectors 12a) and sequential two side surfaces of tubular members 11A are coated with bonding agent S to bond adjacent tubular members 11A to each other as shown in FIG. 3C. In this manner, the tubular members 11A are mutually coupled with the help of the bonding agent S and a collimator 11 of a desired size can be obtained.

For example, when an assembling unit based on numerical control, not shown, is utilized in bonding the tubular members 11A, they can be coupled mutually while performing position control such that the arrangement pitch P1 of tubular members 11A can accurately coincide with the arrangement pitch P2 of detectors 12a.

In the thus produced collimator 11, through coupling of the tubular members 11A by using the bonding agent S, the partition wall 11b formed between adjoining through-holes 11a can have the wall thickness T substantially equal to twice the thickness t of the tubular member 11A and hence the necessary strength can be assured concurrently with the coupling of the tubular members 11A. Accordingly, any separate member for obtaining the strength can be dispensed with and the collimator 11 simplified in construction to have the necessary strength can be obtained. Advantageously, this leads to excellent assemblage productivity and excellent economization.

The collimator 11 has been described as having the tubular member 11A formed by using the lead sheet 11B but the tubular member 11A may be formed by using, in place of the lead sheet 11B, a sheet made of a metallic material of high specific gravity such as lead alloy or tungsten.

In taking a picture by means of the SPECT apparatus provided with the collimator 11 as above, the bed B carrying the examining object H subject to dosage of radioactive medicines is moved to convey the examining object H to a cavity between the cameras 10A and 10B. Then the cameras 10A and 10B are rotated to revolve around the examining object H. Gamma rays discharged from an cumulative part inside examining object H where the radioactive medicines are accumulated (for example, an affected part) pass through the through-hole 11a (see FIG. 2) of collimator 11 so as to be incident upon the corresponding detector 12a. The detector 12a then outputs a gamma ray detection signal. The gamma ray detection signal is processed by the ASIC 13 and fetched to the data processor 2 to create a planar or two-dimensional image or tomographic image information which in turn is displayed on the display unit 3.

Advantages obtained with the present embodiment will be described hereunder.

(1) The collimator 11 is formed by mutually coupling the plurality of tubular members 11A each having the through-hole 11a for passing gamma rays to the detector 12a with the help of the bonding agent S, so that the individual tubular members 11A can be assembled and coupled mutually while easily matching the arrangement pitch P2 of the detectors 12a with that P1 of the through-holes 11a, thereby providing the collimator 11 capable of improving the sensitivity and the radiological imaging apparatus using the collimator 11. Further, since the arrangement pitch P2 of the detectors 12a can match with that P1 of the through-holes 11a, assembling errors are hardly accumulated and a collimator 11 of a relatively large size can be produced with ease.

(2) Since the collimator 11 is built by collecting the plurality of tubular members 11A and then by coupling them with the bonding agent S, collimators 11 of various sizes can be produced easily by changing the number of tubular members 11A. Further, even when the number of detectors 12a of radiological imaging apparatus is changed as the specifications, for example, change, the collimator 11 can be produced easily by changing the number of tubular members 11A in correspondence with the number of detectors 12a and therefore, such a change in specifications can be dealt with without requiring an extensive change in the existing equipments. Accordingly, the economical advantage can be promoted and the cost reduction can be attained.

(3) The collimator 11 is constructed of the plurality of tubular members 11A which are coupled to one another with the help of the bonding agent S, bringing about an advantage that trained skill is not required to thereby promote the assembling productivity.

(4) Due to the fact that the spool jig 30 has a constant cross-section 30a which substantially coincides in size with the end surface 12c of detector 12a, the through-hole 11a of tubular member 11A formed through simplified work of winding the lead sheet 11B around the spool jig 30 can be sized substantially equally to the end surface 12c of detector 12a. Accordingly, a highly precise collimator 11 which hardly causes a difference in sensitivity among the individual detectors 12a can be produced through simplified work.

(5) The height dimension h of lead sheet 11B equals the height dimension h of collimator 11 and therefore, the collimator 11 having the desired height dimension h can be produced by merely coupling together the tubular members 11A formed from the lead sheets 11B with the help of the bonding agent S, thus simplifying the production of collimator 11.

(6) Thanks to the thickness t of lead sheet 11B being substantially half the wall thickness T of the partition wall 11b of collimator 11, mutual coupling of the tubular members 11A can form the partition wall 11b of the predetermined wall thickness T between adjoining through-holes 11a, bringing about an advantage that the collimator 11 having not only the desired strength but also the through-holes 11a arranged at the predetermined arrangement pitch P2 can be obtained through the simplified work of mutually coupling the tubular members 11A. Accordingly, a highly precise collimator 11 which hardly causes a difference in sensitivity among the individual detectors 12a can be produced without resort to intervention of a special step such as precise positioning.

(7) Because of the use of a semiconductor detection element made of a single crystal, for example, CdTe, CdZnTe or GaAs as the detector 12a, the energy resolution can be improved while being added with the advantage of the improved sensitivity of collimator 11, thereby ensuring that high image quality can be attained and besides highly quantitative examination can be achieved.

(8) Since the collimator 11 can prevent the specific interference fringe to thereby improve the sensitivity, the dosage of the radioactive medicines can be reduced and the measurement time can be shortened. The shortened measurement time can lead to an expectant increase in the number of persons to be measured and excellent economical merits and cost reduction can be attained.

Figure 4A:
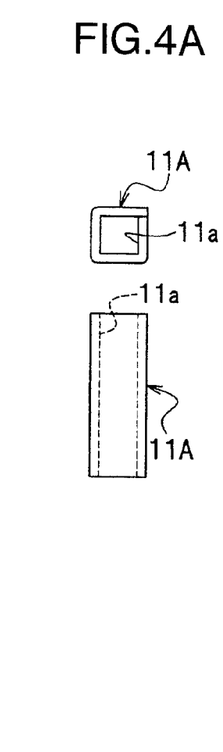
FIGS. 4A to 4C are diagrams showing another example of a process for producing the collimator for use in the SPECT apparatus.
Figure 4B:
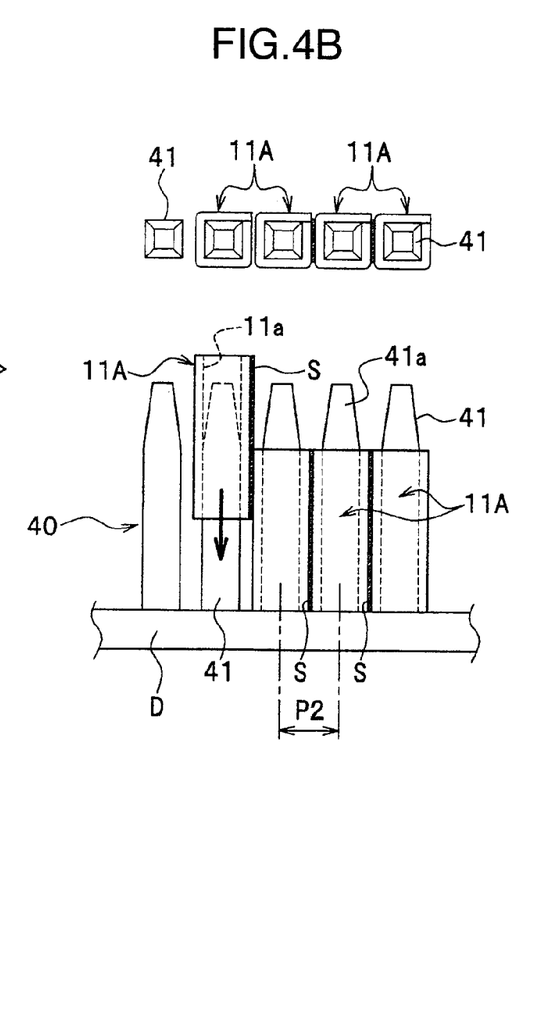
Figure 4C:
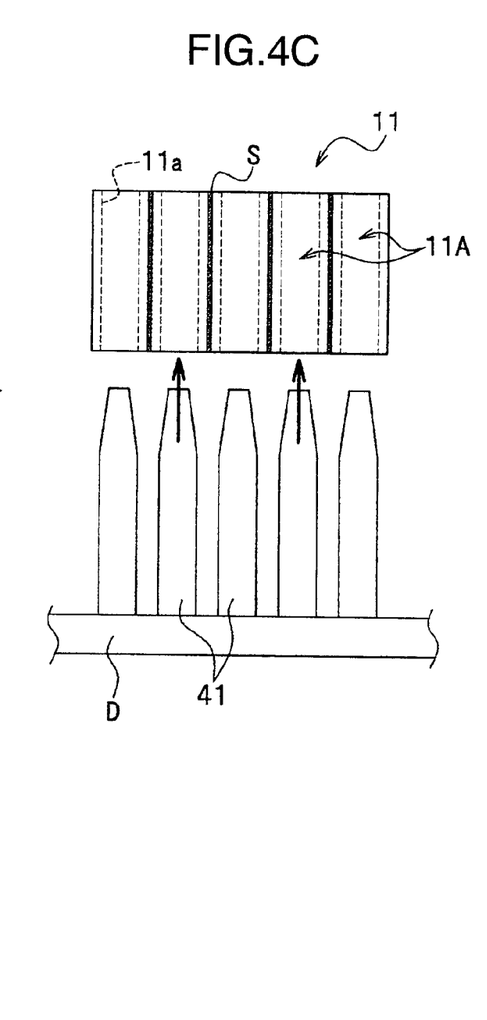

Turning now to FIGS. 4A to 4C, another production process of the collimator 11 used for the SPECT apparatus will be described. An example shown in FIGS. 4A to 4C differs from the previously described production processes in that during mutual coupling of the plurality of tubular members 11A with the bonding agent S, a positioning member 40 for enabling the tubular members 11A to be assembled at locations positioned at the predetermined arrangement pitch P2 is used.

As shown in FIG. 4B, the positioning member 40 has a plurality of quadrangular pillar or prism members 41 studded on a support stand D and individual prism members 41 are arranged at an arrangement pitch P2 equaling the arrangement pitch P2 of the detectors 12a (see FIG. 2). Then, each prism member 41 is formed to be thinner than the through-hole 11a so that it may be inserted to the through-hole 11a of tubular member 11A in a mountable/dismountable fashion. An upper portion 41a of prism member 41 is upwardly converged in the form of an inverted funnel to facilitate sleeve operation of the tubular member 11A. It should be understood that the prism member 41 has its lower portion fitted in a not shown mount hole formed in the support stand D so as to be studded in the support stand in an unremovable fashion.

The collimator 11 can be produced by using the aforementioned positioning member 40 through a process to be described hereunder.

The tubular member 11A used herein can be produced in the form of a quadrangular tube by winding the lead sheet 11B around the spool jig 30 (see FIGS. 3A and 3B) and then drawing out the spool jig 30 (see FIG. 4A).

Subsequently, the bonding agent S is coated on two side surfaces of tubular member 11A contiguous to other tubular members as in the precedence (see FIG. 3C) and as shown in FIG. 4B, resultant tubular members sequentially sleeve the prism members 41 of positioning member 40, thus being held thereon. In this example, a thermosetting bonding agent is used as the bonding agent S. Accordingly, in the course of sequentially holding the tubular members 11A on the prism members 41, the bonding agent S does not solidify and the holding work can proceed smoothly.

Here, the prism members 41 of positioning member 40 are arranged at the arrangement pitch P2 as described previously and hence the tubular members 11A held on the prism members 41 are in place on the prism members 41 at the arrangement pitch P2 by themselves and positioned at the same arrangement pitch P2 as that of the detectors 12a.

After the tubular members 11A have been held on all of the prism members 41, a predetermined amount of heat is applied to solidify the bonding agent S. Thereafter, as shown in FIG. 4C, a block of the coupled tubular members 11A is removed from the positioning member 40. In this manner, a collimator 11 of a desired size having the tubular members 11A mutually coupled with the help of the bonding agent S can be obtained.

By using the positioning member 40 in this manner, the collimator 11 having the tubular members 11A arranged at the arrangement pitch P2 equal to the arrangement pitch P2 of the detectors 12a can be obtained through the simplified work of merely holding the tubular members 11A each coated with the bonding agent S on the prism members 41, respectively, of positioning members 40. Accordingly, the collimator 11 enjoying highly precise positional matching with or alignment to the detectors 12a to contribute to improvements in sensitivity can be obtained through simplified work. Further, there is no need of utilizing an assembling unit based on numerical control, for example, bringing an advantage of excellent assembling productivity and high economization as well.

Figure 5:
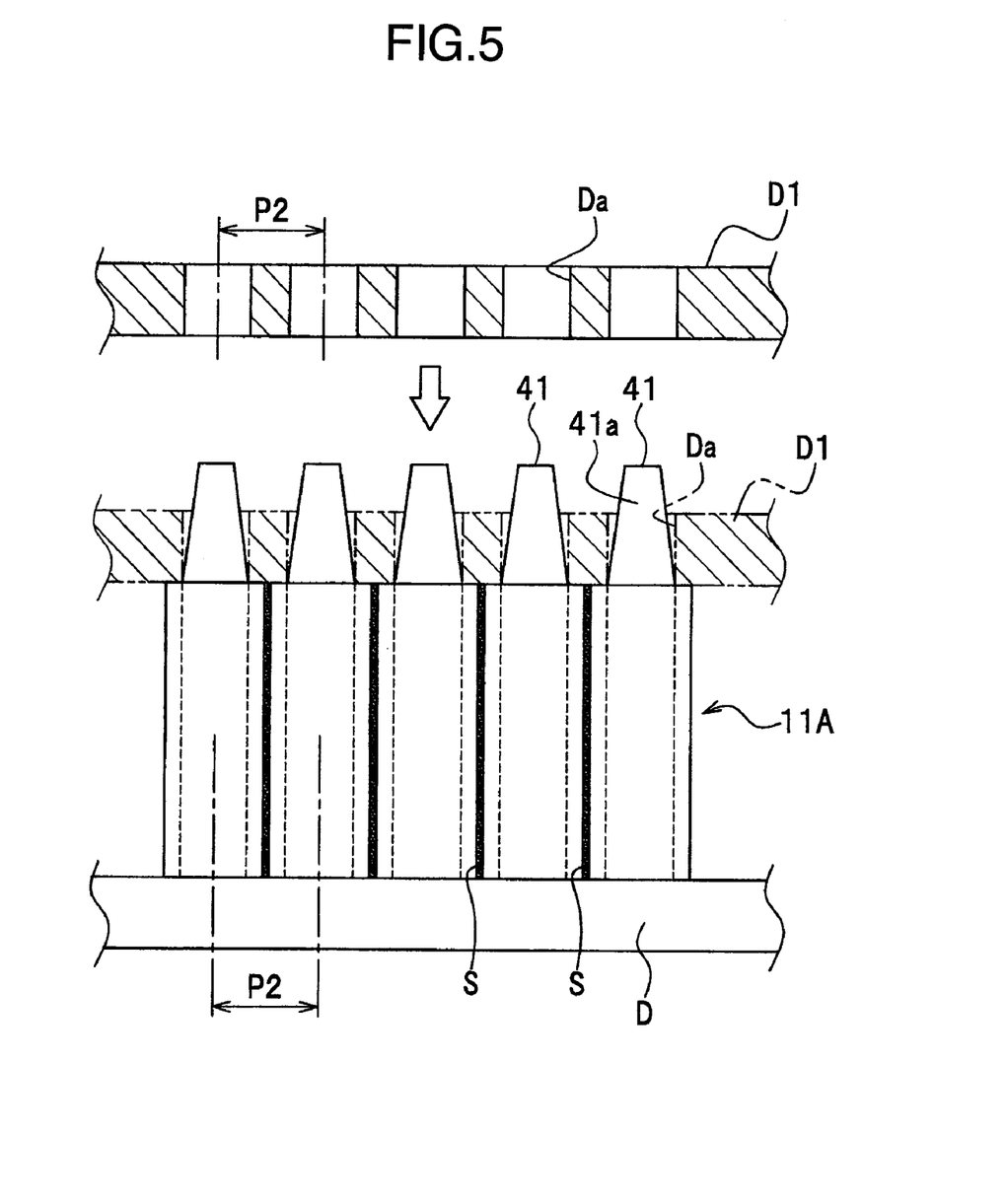
FIG. 5 is a diagram for explaining still another example of a process for producing the collimator.

Alternatively, by using an upper support member D1 constructed similarly to the support stand D, all prism members 41 may be held in place from above as shown in FIG. 5. Formed in the upper support member D1 are positioning holes Da at the same arrangement pitch P2 as that of the prism members 41, the upper portion 41a of each prism member 41 being inserted to the positioning hole Da so as to be held thereby.

The prism members 41 can be held from above and below through the use of the upper support member D1 in this manner, whereby the accuracy of mutual coupling of the tubular members 11A held on the prism members 41 can be improved, thus providing the collimator 11 which can improve the sensitivity with higher accuracies.

Referring to FIGS. 6A to 6E and FIGS. 7A to 7D, still different processes of production of the collimator 11 used for the SPECT apparatus will be described. An example shown in FIGS. 6A to 6E differs from the foregoing examples in that a spool jig 50 made of a material capable of being molten is used.

Figure 6A:
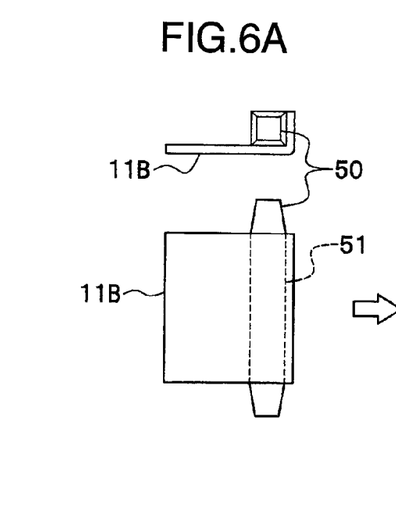
FIGS. 6A to 6E are diagrams showing still another example of a process for producing the collimator for use in the SPECT apparatus.
Figure 6B:
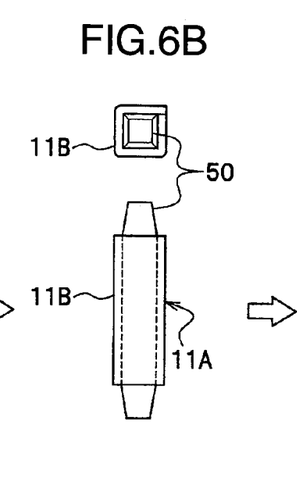

The spool jig 50 is shaped to a quadrangular prism having its upper and lower portions converged or tapered toward opposite ends, respectively, and is made of a material capable of being molten under application of heat, for example, aluminum. A lead sheet 11B is wound around a barrel 51 of spool jig 50 as shown in FIGS. 6A and 6B, forming a quadrangular tubular member 11A (see FIG. 6B).

Figure 6C:
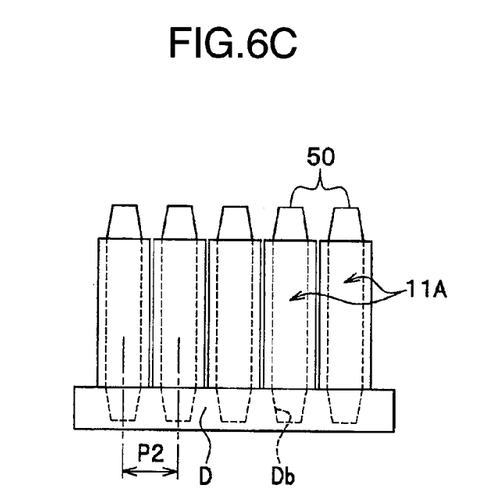

The spool jigs 50 each wound with the lead sheet 11B are mounted to a support stand D which can put the spool jigs 50 together as shown in FIG. 6C. The support stand D is formed with positioning holes Db at the same pitch P2 as that of the detectors 12a (see FIG. 2 as holding true hereinafter) and the lower portion of spool jig 50 is inserted in the positioning hole Db so as to be held thereby.

Figure 6D:
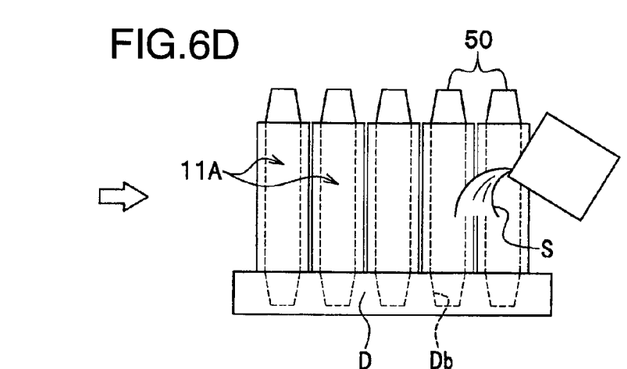

After all the spool jigs 50 have been held on the support stand D, the bonding agent S is impregnated to a gap between adjoining tubular members 11A through a vacuum impregnation, for example, to bond them together as shown in FIG. 6D. Thereafter, a block of the tubular members 11A mutually coupled with the help of the bonding agent S and integral with the spool jigs 50, respectively, is removed from the support stand D and upper and lower end surfaces are then polished by predetermined amounts to provide a thickness necessary for the collimator 11.

Figure 6E:
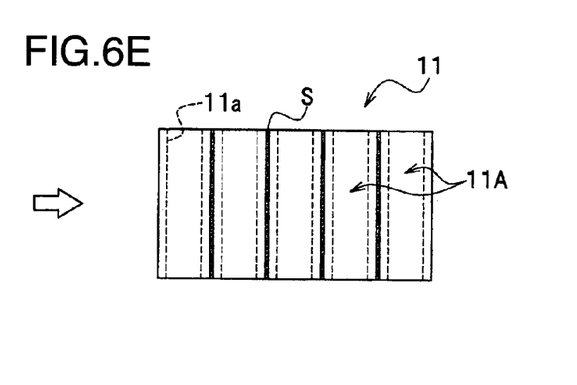

Subsequently, the spool jigs 50 are molten through a process of applying heat or adding a medicine. Eventually, the collimator 11 removed of the spool jigs 50 can be obtained as shown in FIG. 6E.

According to the thus produced collimator 11, the bonding agent S can be impregnated to a gap between adjoining tubular members 11A even if the gap is narrow and the tubular members can mutually be coupled satisfactorily. In addition, the thickness of bonding agent S can be small to permit the through-hole 11a of tubular member 11A to be set largely correspondingly. Accordingly, a collimator 11 further improved in sensitivity can be obtained.

An example shown in FIGS. 7A to 7D features the shape of a spool jig 60 and differs from the foregoing examples in that the upper and lower portions have each a width L equal to the arrangement pitch P2 of the detectors 12a.

Figures 7A, 7B:
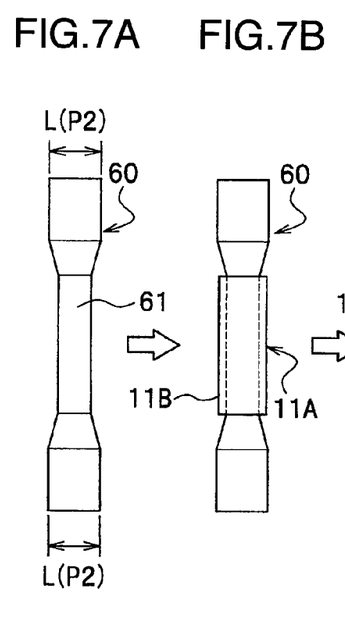
FIGS. 7A to 7D are diagrams showing yet still another example of a process for producing the collimator for use in the SPECT apparatus.
Figure 7C:
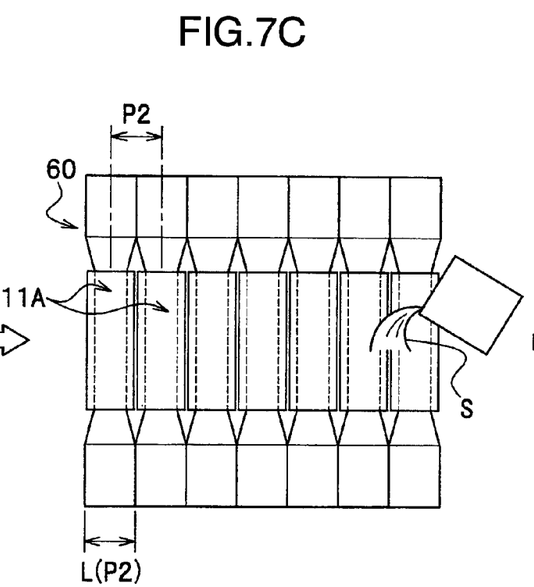

A barrel 61 of spool jig 60 around which a lead sheet 11B is wound has the same thickness as that of the aforementioned spool jig 30 (see FIGS. 3A and 3B) and a tubular member 11A of a desired size can be obtained by winding the lead sheet 11B around the barrel 61. Each of the upper and lower portions of spool jig 60 has the width L equal to the arrangement pitch of detectors 12a as mentioned above and when a plurality of structures each having the lead sheet 11B wound around the barrel 61 of spool jig 60 as shown in FIG. 7B are aligned while being mutually coupled in an intimated fashion as shown in FIG. 7C, the tubular members 11A wound around the spool jigs 60, respectively, can be arranged in the same arrangement pitch P2 as that of the detectors 12a.

Accordingly, like the preceding example, when the tubular members 11A are bonded together by impregnating the bonding agent S in a gap between adjoining tubular members through a vacuum impregnation process, for example, a block of the tubular members 11A arranged in the same arrangement pitch as that of the detectors 12a can be provided.

Figure 7D:
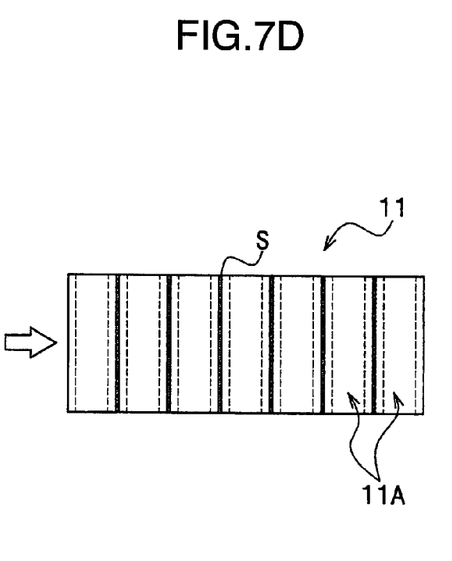

Then, by melting the spool jig 60 through a process of applying heat or adding a medicine as in the case of the preceding example, a collimator 11 removed of the spool jigs 60 can be obtained as shown in FIG. 7D.

In the foregoing embodiments, the collimator 11 is constructed by forming the tubular members 11A from the lead sheet 11B but this is not limitative and a collimator 11 may be constructed by a pipe-like member which is cut to a plurality of sections each having a predetermined length and by mutually coupling these sections.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A collimator comprising:
a plurality of metal tubular members each having a through-hole for passing to a radiological detection device gamma rays in a specified direction out of those radiated from an object to be examined, said plurality of tubular members being mutually coupled with the help of a bonding agent,
wherein each of said plurality of metal tubular members is formed by winding a sheet about a quadrangular prism spool jig, and said plurality of tubular members are mutually coupled as a unit with a partition wall between adjoining ones of said through-holes having a wall thickness substantially equal to twice a wall thickness of said tubular members.

2. A radiological imaging apparatus comprising:
a collimator disposed to oppose a radiological detection device and having through-holes for passing to said radiological detection device gamma rays in a specified direction out of those radiated from an object to be examined, said collimator being produced by mutually coupling a plurality of metal tubular members each having the through-hole with the help of a bonding agent in positional matching with a plurality of detectors constituting said radiological detection device,
wherein each of said plurality of metal tubular members is formed by winding a sheet about a quadrangular prism spool jig, and said plurality of tubular members are mutually coupled as a unit with a partition wall between adjoining ones of said through-holes having a wall thickness substantially equal to twice a wall thickness of said tubular members.

3. A radiological imaging apparatus according to claim 2, wherein when mutually coupling said plurality of tubular members of said collimator with the help of the bonding agent, said tubular members are mutually positioned by means of positioning members respectively inserted in said through-holes of said tubular members, whereby the arrangement pitch of said tubular members coincides with that of said detectors.

4. A nuclear medicine diagnosis apparatus comprising:
the radiological imaging apparatus as recited in claim 3;
a gantry for supporting said radiological imaging apparatus;
a tomographic image information creating unit for acquiring detection signals from said radiological detection device to create image information; and
a display unit for displaying said image information.

5. A nuclear medicine diagnosis apparatus comprising:
the radiological imaging apparatus as recited in claim 2;
a gantry for supporting said radiological imaging apparatus;
a tomographic image information creating unit for acquiring detection signals from said radiological detection device to create image information; and
a display unit for displaying said image information.

* * * * *